United States Patent
Lin et al.

[11] Patent Number: 6,103,339
[45] Date of Patent: Aug. 15, 2000

[54] LIGHT TEXTURE PROCESS OF FABRICATING A MAGNETIC RECORDING MEDIA

[75] Inventors: Cheng-Der Lin, Tai-Chun Hsieng; Jason S. Lin, I-Laing Hsieng; Yuan-Ming Chang, Bun-Chau; An-Hung Tan, Pin-Chen, all of Taiwan

[73] Assignee: Trace Storage Technology Corporation, Taiwan

[21] Appl. No.: 09/003,187

[22] Filed: Jan. 6, 1998

[30] Foreign Application Priority Data

Nov. 19, 1997 [TW] Taiwan .................................. 86117315

[51] Int. Cl.⁷ ........................................................ G11B 5/66
[52] U.S. Cl. ..................................... 428/141; 428/694 TR; 428/694 SG; 428/900; 427/129; 427/508; 427/510; 364/474.06; 364/474.08
[58] Field of Search ...................... 478/694 TR, 694 SG, 478/141; 427/129, 508, 510; 364/474.06, 474.08

[56] References Cited

U.S. PATENT DOCUMENTS

| 5,108,781 | 4/1992 | Ranjan | ..................................... 427/556 |
| 5,586,040 | 12/1996 | Baumgart | .............................. 364/474.8 |

Primary Examiner—Leszek Kiliman
Attorney, Agent, or Firm—Fish & Richardson P.C.

[57] ABSTRACT

Nowadays, in fabricating a magnetic recording medium, a disk substrate is first mechanically polished to form an even surface. Next, a laser texturing process is performed to produce a textured annular landing zone on the disk substrate. A magnetic layer is then formed on the disk substrate to complete the fabrication process. However, abnormal asperity usually remains on the surface of the disk substrate. Further, as the amount of exposure time in the air increases, an oxide film is inevitably formed on the surface of the disk substrate. Both of them degrade the surface smooth of the disk substrate, resulting in poor control of the size and structure of the laser texture. In addition, due to the irregular distribution of the mechanical polished texture on the disk substrate, a subsequently formed magnetic layer can not easily achieve the desired properties. This invention therefore provides a light texture process for fabricating a magnetic recording medium. The process is characterized in forming light textures by a two-step light texturing process before forming the laser texture on a disk substrate. The process is intended to remove abnormal asperity and oxide film on the disk substrate, as well as form a plurality of circumferential light textures on the surface of the disk substrate. The roughness of the circumferential light textures is less than that of the laser texture. As the surface smooth of the disk substrate is improved, the size and structure of the laser texture are more controllable. Furthermore, it is easier to form a magnetic layer having desired properties because the circumferential light textures are distributed in a regular way.

9 Claims, 7 Drawing Sheets

LIGHT TEXTURE PROCESS OF FABRICATING A MAGNETIC RECORDING MEDIA

BACKGROUND OF THE INVENTION

1. Field of the Invention

This invention relates in general to the fabrication of a magnetic recording medium, and more particularly, to a modified magnetic recording medium with light textured surface by using a two-step light texturing process before forming the laser texture on a disk substrate. Pluralities of circumferential light textures are formed on a disk substrate to improve the properties of the laser textured landing zone and the magnetic layer.

2. Description of Related Art

A hard-disk drive is a data storage device that contains at least one magnetic recording medium. It has been widely utilized in today's electrical information industry. A hard-disk drive essentially includes: a rotatable disk with concentric data tracks containing the information; a head for reading and/or writing data; and an actuator connected to a carrier for moving the head to the desired track and maintaining it over the track centerline during read or write operations. There are typically a plurality of disks separated by spacer rings and stacked on a hub that is rotated by a disk drive motor. A housing supports the drive motor and head actuator, and surrounds the head and disk to provide a substantially sealed environment for the head-disk interface.

FIG. 1 depicts a plan view of a conventional magnetic recording medium and a head for reading and/or writing operations, schematically illustrating the basic configuration and structural relationship of a hard-disk drive. As shown in the drawing, there is a disk substrate 20, such as an aluminum (Al) disk plated with nickel-phosphorous (NiP). The center area of the disk substrate 20 is engaged with a rotatable spindle (not shown). An annular area adjacent to the outer edge 202 of the disk substrate 20 is coated with a magnetic layer to form an annular data region 21. A head 27 is disposed on a carrier 24 and an actuator 26 connected to the carrier 24 for moving the head 27 to the desired track. Another annular area adjacent to the inner edge 201 of the disk substrate 20 is textured to form a landing zone 23. In conventional magnetic hard-disk drive, the head carrier is an air-bearing slider that rides on a bearing of air above the disk surface when the disk is rotating at its operational speed.

To improve the wear resistance of the disk substrate 20, as well as to maintain consistent magnetic properties, it is desirable to make the disk surface as smooth as possible. However, a very smooth disk surface creates a problem known as "stiction." This means that after the slider has been in stationary contact with the disk for a period of time, the slider tends to resist translational movement or "stick" to the disk surface. Stiction in a hard disk drive can result in damage to the head 27 or disk substrate 20 when the slider suddenly breaks free from the disk surface when disk rotation is initiated. In some hard-disk drives, such as low-power hard-disk drives used in laptop and notebook computers, the disk drive motor may simply be unable to initiate rotation or achieve operating speed because of the adhesion forces that cause stuck sliders or excessive drag.

It is noted that the head 27 comes into contact with the disk substrate 20 only when it lands on the landing zone 23. Thus, in order to prevent the stiction problem, a plurality of texture are usually formed on the landing zone 23 to increase the surface roughness, thereby reducing the stiction between the head 27 and the disk substrate 20. The U.S. Pat. No. 5,109,781 and No. 5,062,021 disclose a method of forming texture on the landing zone using a laser-texturing process. FIG. 2 is a flow chart showing the above laser texturing process of fabricating a magnetic recording medium. Starting with step 10 of the flow chart, a disk substrate, such as an aluminum disk plated with nickel-phosphorous is provided. Next, going on to step 12 of the flow chart, a mechanical polishing process is performed to produce a substantially even surface on the disk substrate. Then, going on to step 14 of the flow chart, a plurality of textures are created on the inner portion of the disk substrate by laser pulse to form an annular landing zone. After that, going to steps 16 and 18 of the flow chart, a magnetic layer and a protective layer are successively formed on the surface of the disk substrate.

Accordingly, the disk drive properties can be improved by forming a laser texture on the landing zone to reduce disk stiction. However, as the surface roughness of the disk substrates from various supplier differs, abnormal asperity usually remains on the surface of the disk substrates, even after performing the mechanical polishing process. Further, as the amount of exposure time in the air increases, an oxide film is inevitably formed on the surface of the disk substrate. This not only affects the surface roughness of the disk substrate but also varies the surface composition of the disk substrate. When applying the laser pulse to these various materials, the results are unpredictable.

FIG. 3 is a partial perspective view of the magnetic recording medium fabricated by the process of FIG. 2. Several abnormal asperities are found on the surface of the disk substrate. These degrade the surface smoothness of the disk substrate, resulting in poor control of the size and structure of the laser texture. In addition, as shown in FIG. 3, with irregular distribution of the mechanical polished texture on the disk substrate, some main properties of the latter-formed magnetic layer, such as the coercivity (Hcr) and the remanence (Mrt) exceed the desired range.

SUMMARY OF THE INVENTION

It is therefore an object of the present invention to provide a method of fabricating a magnetic recording medium that prevents the drawbacks incurred with the prior art method. Thus, the laser texture's size and shape are more controllable and the characteristics of the magnetic layer are improved.

It is another object of the present invention to provide a magnetic recording medium with a substantially smooth surface, so as to improve the fabrication of the laser texture and the characteristics of the magnetic layer.

In accordance with a first aspect of the present invention, a modified method of preparing a disk substrate with a light textured surface is provided. The method is characterized in forming light textures by two-step light texturing processes before forming the laser texture on a disk substrate. More particularly, a first light texturing process is performed on a disk substrate. This process is intended to remove abnormal asperity and oxide film on the disk substrate, as well as form a plurality of circumferential light textures on the surface of the disk substrate. A second light texturing process is then performed to level off any ridges created by the first light texturing process, thereby forming a substantially smooth surface of the disk substrate. Next, a laser texturing process is performed to form an annular landing zone at the inner part of the disk substrate. After that, a magnetic layer can be formed on the surface of the disk substrate.

In accordance with a second aspect of the present invention, a textured disk substrate for fabricating a magnetic recording medium is provided. The disk substrate has a plurality of laser texture formed at the inner part of the disk substrate to construct an annular landing zone, and a plurality of circumferential light textures formed at the other part of the disk substrate, wherein the roughness of the circumferential light textures is smaller than that of the laser texture. The cross-angles between the circumferential light textures are varied according to the region of the disk substrate. Especially, they are in a range of 6 to 8 degrees for the inner region, in a range of 4 to 6 degrees for the middle region, and in a range of 2 to 4 degrees for the outer region, respectively.

According to a preferred embodiment of the present invention, the first light texturing process includes the steps of: spinning the disk substrate clockwise at a speed of about 150 rpm; introducing a diamond slurry with a diameter of about 1 μm onto the disk substrate; lightly texturing the surface of the disk substrate for about 6 seconds by a texturing tape with a pressure of about 1 pound and a vibration range of about 2 mm. The second light texturing process includes the steps of: spinning the disk substrate counterclockwise at a speed of about 150 rpm; introducing a diamond slurry with a diameter of about 1 μm onto the disk substrate; lightly texturing the surface of the disk substrate for about 8 seconds by a texturing tape with a pressure of about 1 pound and a vibration range of about 2 mm. Furthermore, the second light texturing process produces a substantially smooth surface of the disk substrate with a roughness (Ra) of between 8 and 12 Å.

BRIEF DESCRIPTION OF THE DRAWINGS

Other objects, features, and advantages of the present invention will become apparent by way of the following detailed description of a preferred but non-limiting embodiment. The description is made with reference to the accompanying drawings in which.

DESCRIPTION OF THE PREFERRED EMBODIMENT

The main aspect of this invention method is to perform a two-step light texturing process before the laser texturing process. This can smooth the disk surface and form a plurality of light textures regularly distributed on the surface of the disk substrate. The size and structure controllability of the laser texture, as well as the properties of the magnetic layer finally can be improved. A preferred embodiment according to this invention is described as follows, with reference to both FIG. 4 and FIG. 5.

Figure 4:
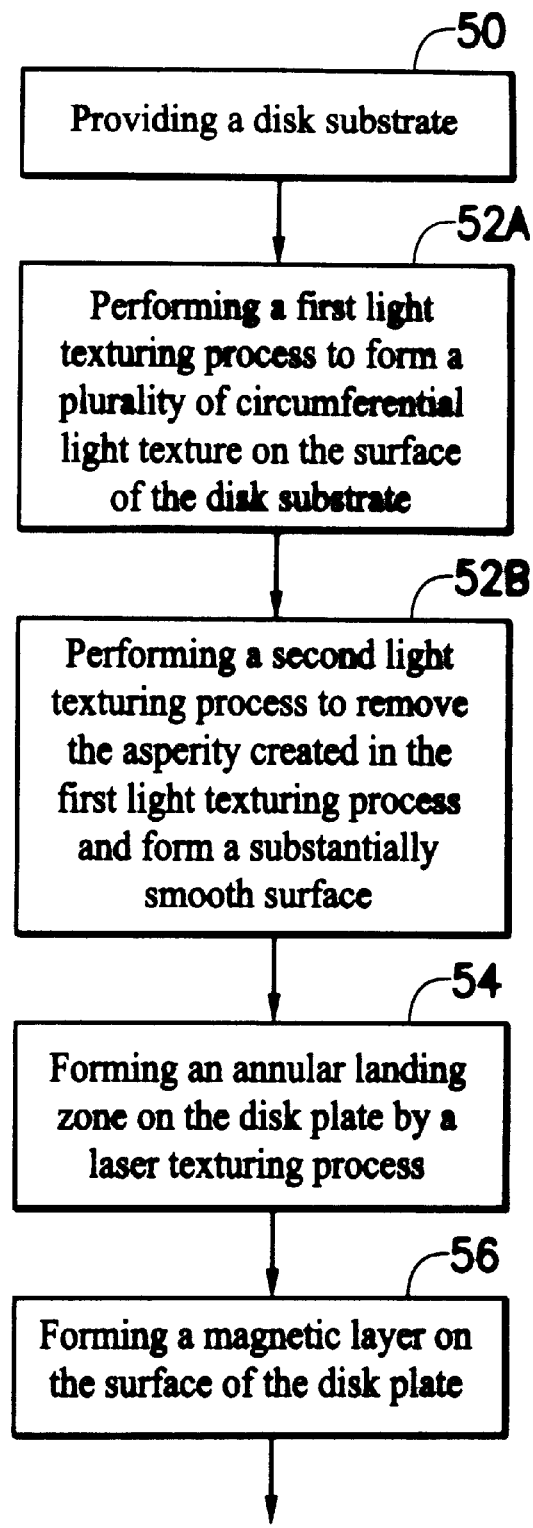
FIG. 4 is a flow chart showing the process steps of preparing a textured disk substrate according to the present invention.

FIG. 4 shows a flow chart illustrating the fabricating process according to a preferred embodiment of the present invention. First, as shown in step 50 of the flow chart, a disk substrate such as an aluminum disk plated with nickel-phosphorous is provided. Abnormal asperity and native oxide film are automatically formed on the surface of the disk substrate. As known by the persons in the art, the abnormal asperity is a raised portion of the disk substrate having a specific height $R_p$ larger than or equal to four times of the average height $R_a$ (i.e. $R_p > 4R_a$). Next, proceeding to step 52A of the flow chart, a first light texturing process is performed. This process is capable of removing abnormal asperity, as well as the oxide film on the surface of the disk substrate. Furthermore, a plurality of circumferential light textures with smaller roughness than that of the latter-formed laser texture are also created on the surface of the disk substrate by the first light texturing process.

Some of the current commercial texturing machines, such as the EDC 1800 from the Exclusive Design Company, can be used to perform the first light texturing process. For example, the disk substrate is first spun clockwise at a speed of about 150 rpm. Next, diamond slurry with a diameter of about 1 μm is introduced onto the disk substrate. The disk substrate is then lightly textured by a texturing tape with a pressure of about 1 pound and a vibration range of about 2 mm for about 6 seconds. Since the light texturing process is performed with spinning and vibration, the light textures are distributed in a substantially regular manner and have moderate cross angles therebetween. It has been measured that the cross angles of the light textures are varied relating to the area of the disk substrate. In the present embodiment, they fall within a range of 6 to 8 degrees for the inner region (ID), in a range of 4 to 6 degrees for the middle region (MD), and in a range of 2 to 4 degrees for the outer region (OD), respectively.

Proceeding next to step 52B of the flow chart, a second light texturing process is performed using lower pressure than the first light texturing process. This process is capable of improving the smoothness of the disk substrate surface by leveling off any "ridges" created by the first light texturing process. The current commercial texturing machine can conduct the second light texturing process as well. For example, the disk substrate is first spun counterclockwise at a speed of about 150 rpm. Next, diamond slurry with a diameter of about 1 μm is introduced onto the disk substrate. The disk substrate is then lightly textured by a texturing tape with a pressure of about 1 pound and a vibration range of about 2 mm for about 8 seconds. Thus, a disk substrate having a substantially smooth surface and a plurality of circumferential light textures is fabricated. The roughness (Ra) of the disk substrate is in a range of between 8 and 12 Å.

Next, proceeding to step 54 of the flow chart, a plurality of textures are formed on the inner region of the disk substrate by a laser texturing process, so as to form an annular landing zone with rough surface. After that, proceeding to step 56 of the flow chart, a magnetic layer is formed on the surface of the disk substrate completing the fabrication of a magnetic recording medium, as shown in FIG. 5.

Figure 1:
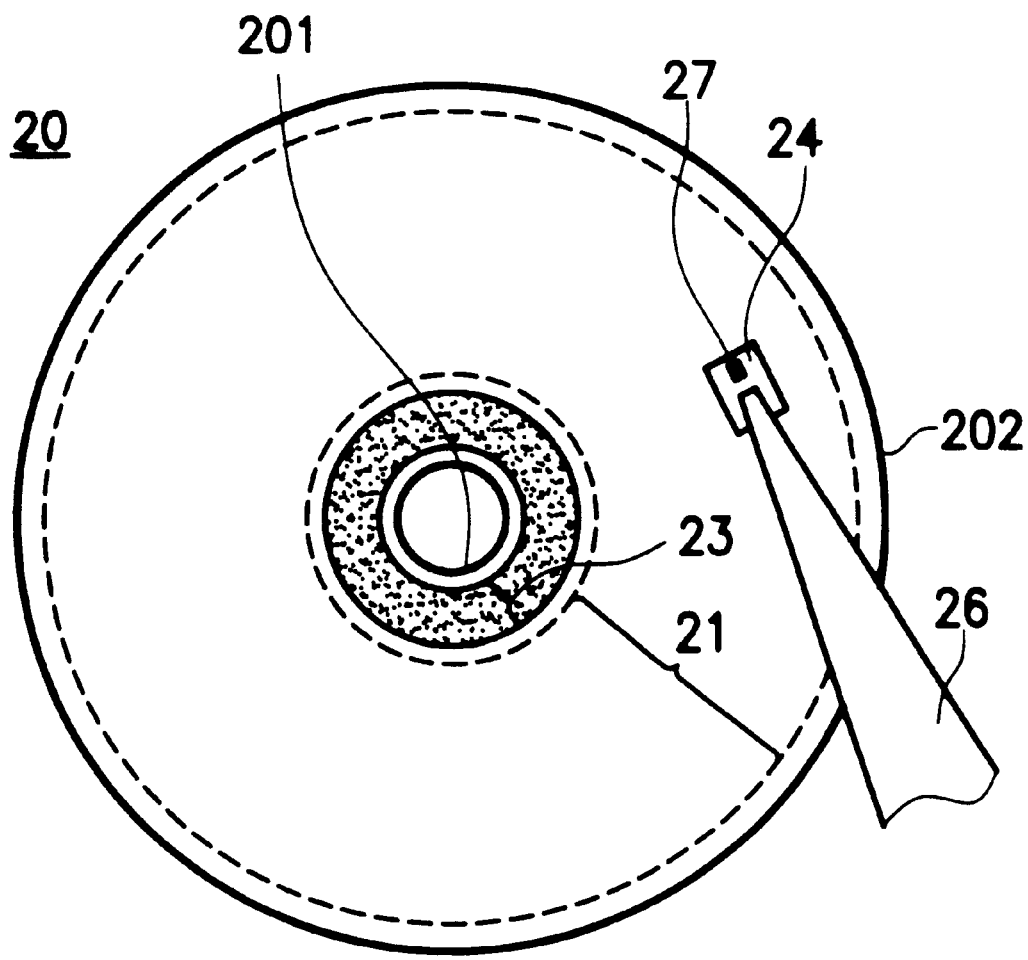
FIG. 1 is a plan view of a conventional magnetic recording medium and a read/write head.
Figure 2:
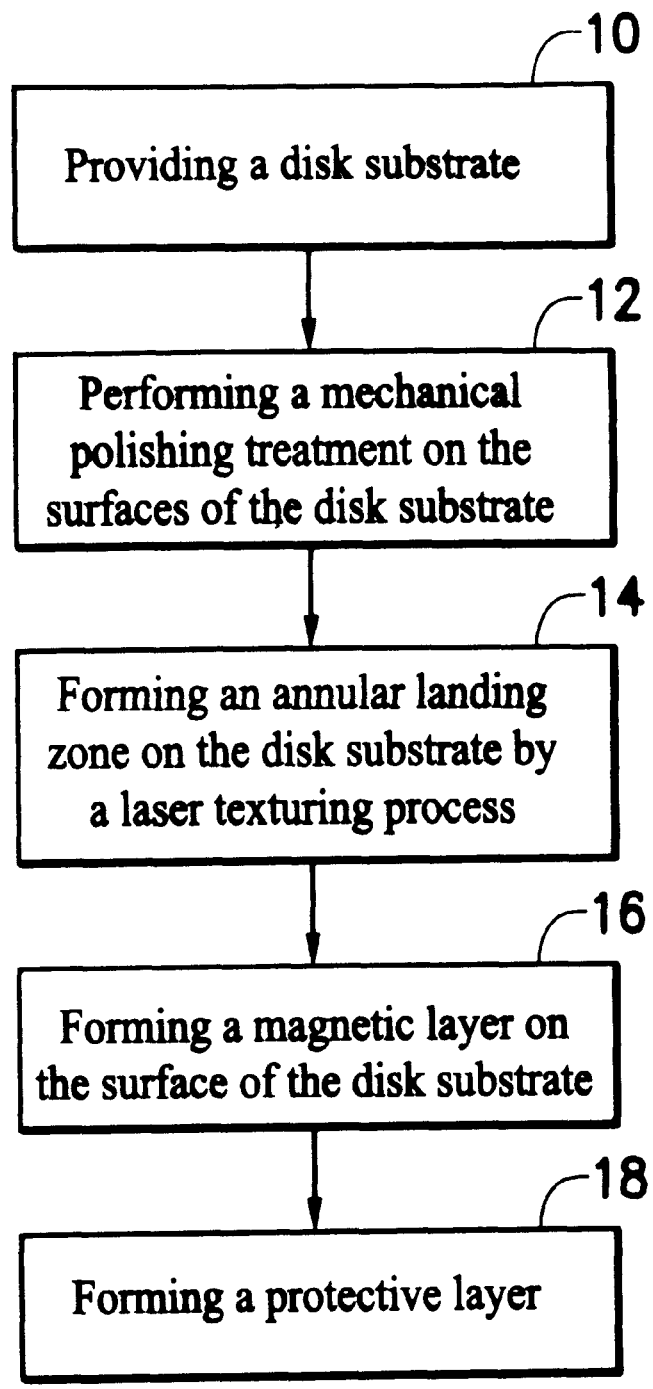
FIG. 2 is a flow chart showing a conventional process of fabricating a magnetic recording medium.
Figure 3:
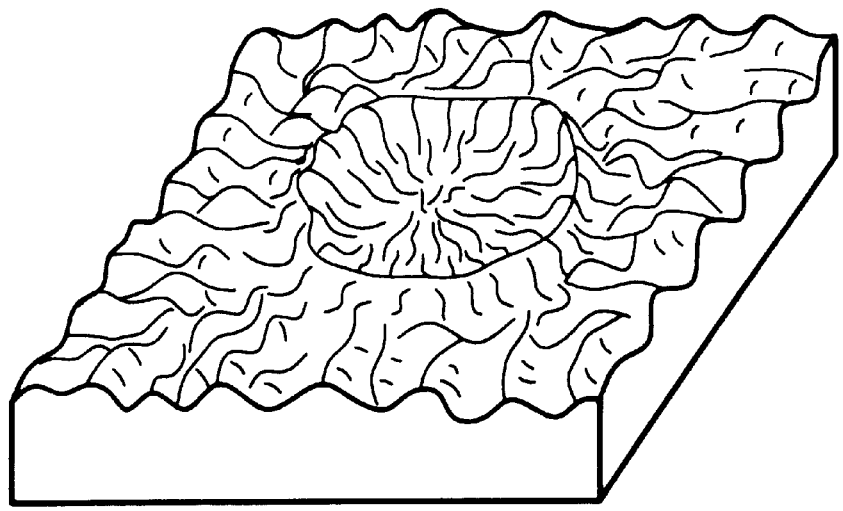
FIG. 3 is a partial perspective view of the magnetic recording medium fabricated by the process of FIG. 2.
Figure 5:
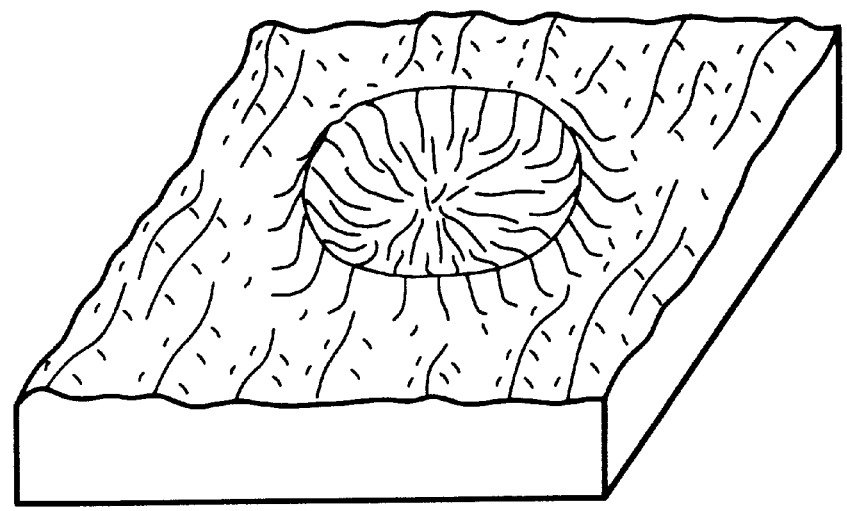
FIG. 5 is a partial perspective view of the disk substrate fabricated by the process of FIG. 4.

Comparing FIG. 5 with FIG. 3, both of the abnormal asperities and the oxide film are removed by the abovementioned two-steps light texturing process. The controllability of the size and structure of the laser textures is then improved. Furthermore, the surface topography of the disk substrate is enhanced since the light textures are regularly distributed on the disk substrate. This results in marked improvement of the properties of the magnetic layer.

Figure 6:
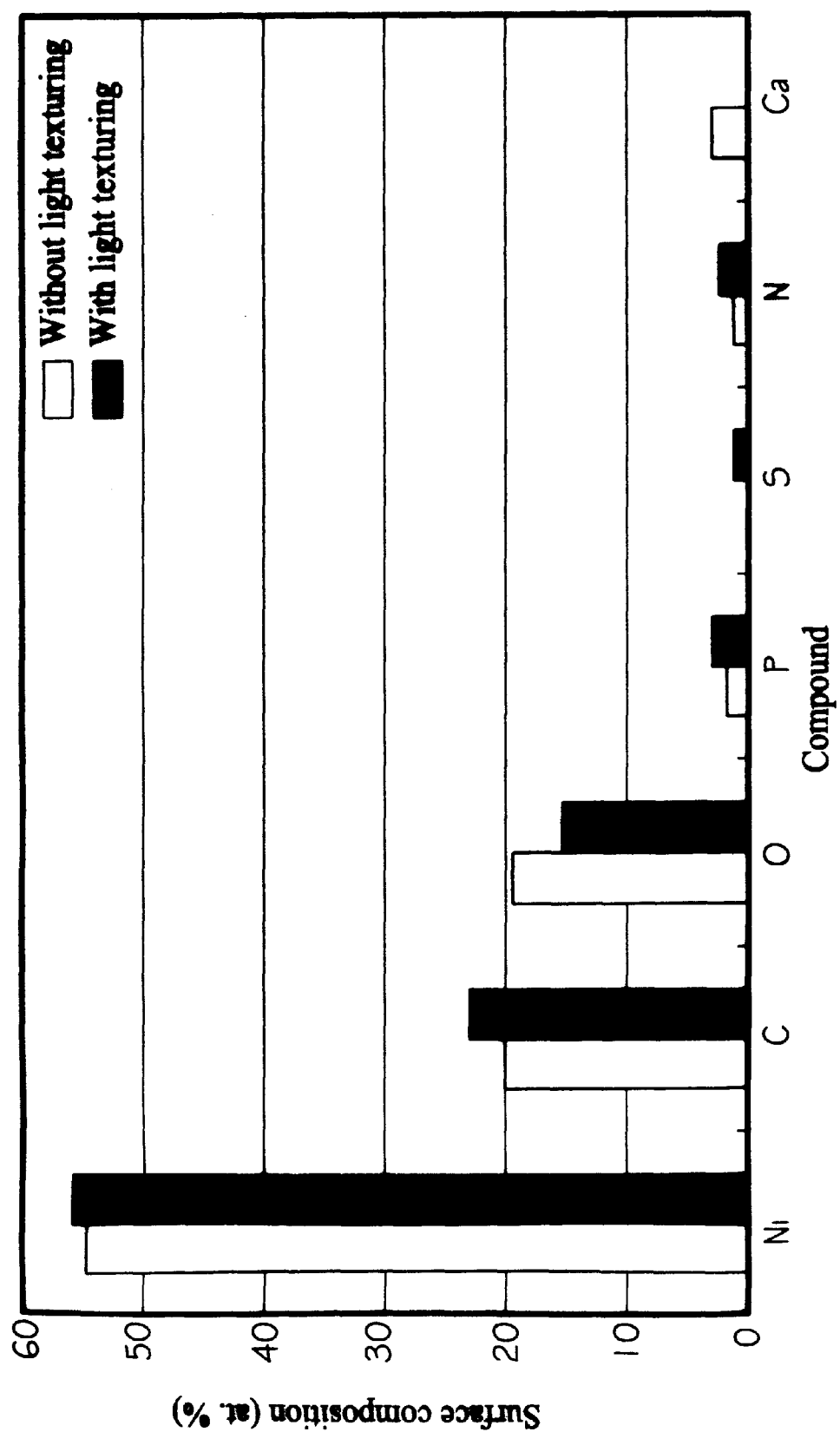
FIG. 6 is a column chart showing the surface composition of a disk substrate with/without having undergone the light texturing process.
Figure 7:
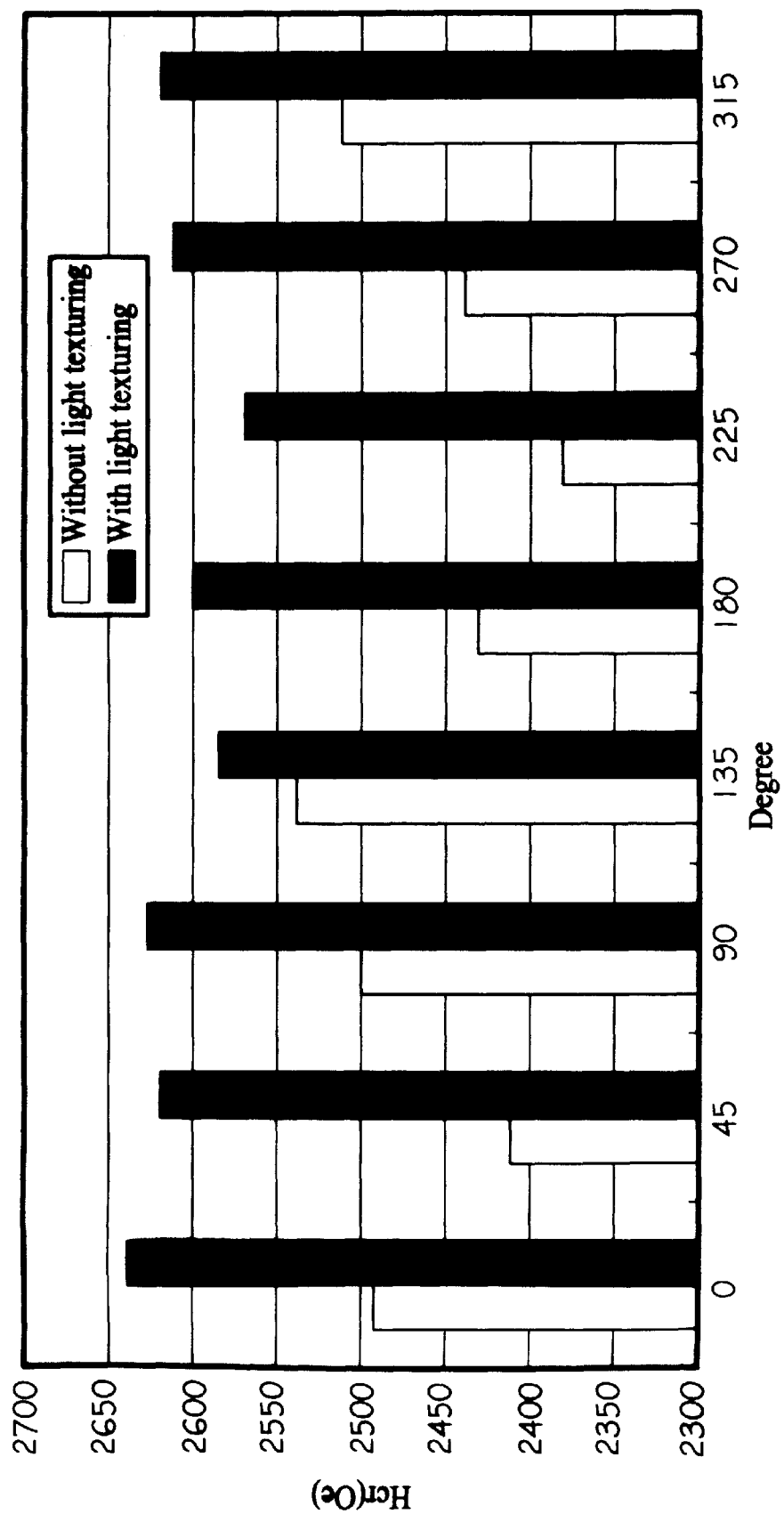
FIG. 7 is a column chart showing the coercivity (Hcr) of the magnetic layer at various angles of the disk substrate with/without having undergone the light texturing process.
Figure 8:
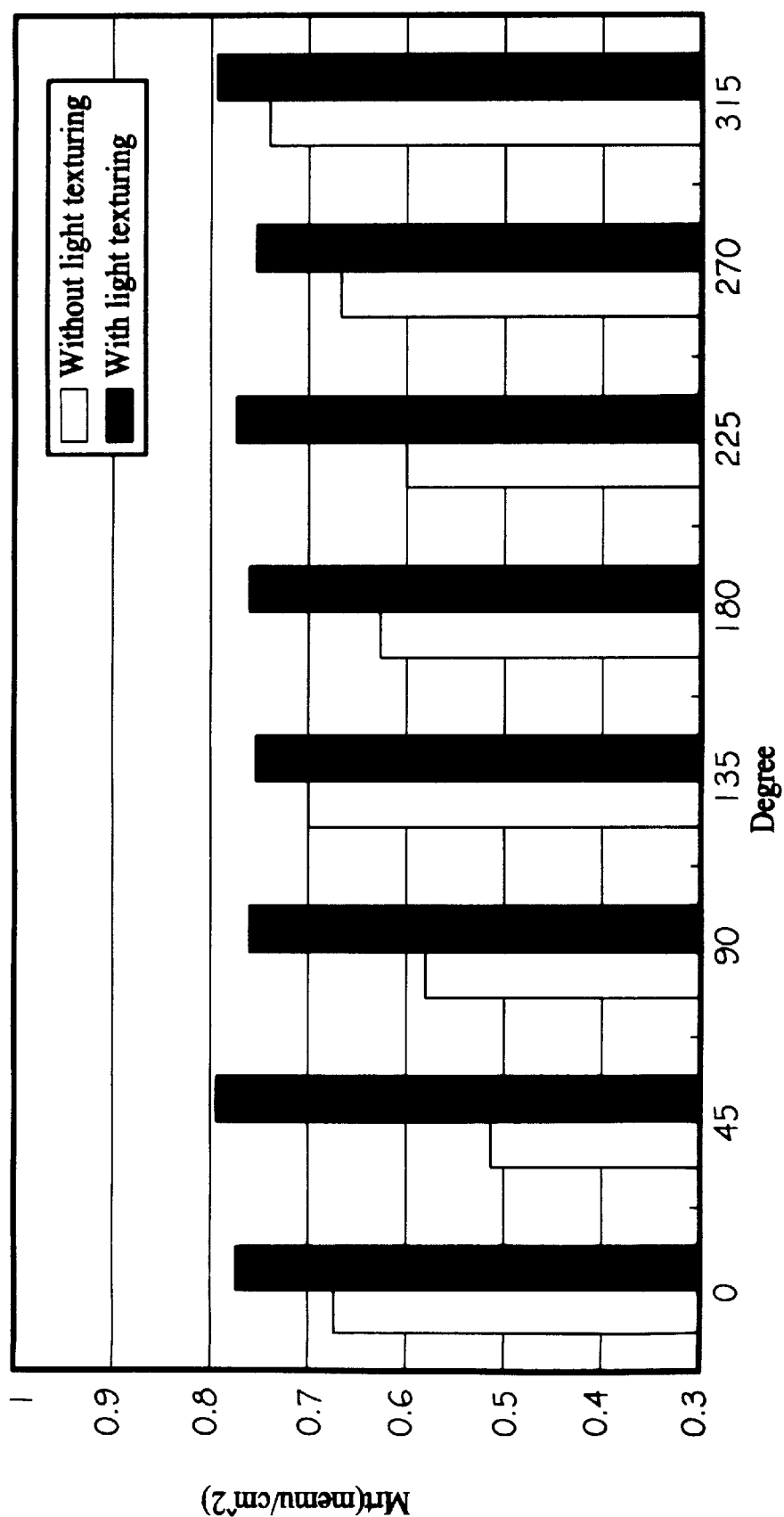
FIG. 8 is a column chart showing the remanence (Mrt) of the magnetic layer at various angles of the disk substrate with/without having undergone the light texturing process.

The following surface analysis results and magnetic property measurements shown in FIGS. 6 to 8 can further prove the advantages of this invention's technology. FIG. 6 is a column chart of an Auger spectrum data, which shows the surface composition of a disk substrate with/without having undergone the light texturing process. The white columns stand for a disk substrate that has not been subjected to a light texturing process, and the black columns stand for a disk substrate that has been treated by the light texturing process. It appears that, after performing the light texturing process, the surface oxygen composition is reduced from 20% to 15%. This confirms that the light texturing process can remove the oxide film on the disk substrate surface.

FIG. 7 and FIG. 8 are column charts showing the data measured by a remanent moment magnetometer (RMM). FIG. 7 illustrates the coercivity (Hcr) of a magnetic layer at various angles of the disk substrate with/without having undergone the light texturing process. The white columns stand for a disk substrate that has not been subjected to a light texturing process, and the black columns stand for a disk substrate that has been treated by the light texturing process. Without the light texturing process, the magnetic layer's Hcr values measured at any angle of the disk substrate can not excess 2550 Oe. On the other hand, after performing the light texturing process, all of the Hcr values are higher than 2600±50 Oe—the minimum coercivity requirement for today's magnetic recording medium applications.

FIG. 8 shows the remanence (Mrt) of a magnetic layer at various angles of the disk substrate with/without having undergone the light texturing process. The white columns stand for a disk substrate that has not been subjected to a light texturing process, and the black columns stand for a disk substrate that has been treated by the light texturing process. Without the light texturing process, the magnetic layer's Mrt values measured at any angle of the disk substrate can not exceed 0.73 memu/cm$^2$. On the other hand, after performing the light texturing process, all of the Mrt values are higher than 0.75±0.05 memu/cm$^2$—the minimum remanence requirement for today's magnetic recording medium applications.

In summary, the magnetic recording medium according to the present invention has the following advantages:

1. The two-step light texturing process before the landing zone laser texturing process can remove both of the abnormal asperities and the oxide film on the surface of the disk substrate. The controllability of the size and structure of the laser textures is then improved.
2. Furthermore, the surface topography of the disk substrate is enhanced since the light textures are regularly distributed on the disk substrate. The magnetic layer is then more easily formed on the surface of the disk substrate. This results in evident improvement of the properties of the magnetic layer.

While the invention has been described by way of example and in terms of preferred embodiments, it is to be understood that the invention is not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A method of preparing a disk substrate having a textured surface, comprising the steps of:
    performing a first texturing process with a first pressure level to remove abnormal asperities and an oxide film formed on a surface of said disk substrate;
    performing a second texturing process with a second pressure level, less than the pressure level to level off any ridges created by the first light texturing process, thereby forming a substantially smooth surface of said disk substrate; and
    performing a laser texturing process to form an annular landing zone on an inner circumferential portion of said disk substrate.

2. A method of preparing a disk substrate having a textured surface according to claim 1, wherein the first texturing process includes the steps of:
    spinning said disk substrate in a clockwise direction at a speed of about 150 rpm;
    introducing diamond slurry with a diameter of about 1 $\mu$m onto said disk substrate;
    texturing the surface of said disk substrate for about 6 seconds using a texturing tape with a pressure level of about 1 pound and a vibration range of about 2 mm.

3. A method of preparing a disk substrate having a textured surface according to claim 1, wherein the second texturing process includes the steps of:
    spinning said disk substrate in a counterclockwise direction at a speed of about 150 rpm;
    introducing diamond slurry with a diameter of about 1 $\mu$m onto said disk substrate;
    texturing the surface of said disk substrate for about 8 seconds using a texturing tape with a pressure level of about 1 pound and a vibration range of about 2 mm.

4. A method of preparing a disk substrate having a textured surface according to claim 1, wherein the second texturing process produces a substantially smooth surface of said disk substrate with a roughness (Ra) of between 8 Å and 12 Å.

5. A method of preparing a disk substrate having textured surface according to claim 1, wherein the first texturing step forms a plurality of circumferential light textures having a cross angle characteristic in a range of 6 to 8 degrees for the inner circumferential portion, in a range of 2 to 4 degrees for an outer circumferential portion, and in a range of 4 to 6 degrees for an intermediate range between the inner and outer circumferential regions, respectively.

6. A textured disk substrate for fabricating a magnetic recording medium having a plurality of laser textures at an inner circumferential portion of said disk substrate providing an annular landing zone; and a plurality of circumferential light textures formed at a remaining portion of said disk substrate,
    wherein a roughness characteristic of said light textures at the remaining portion of the disk substrate is less than a roughness characteristic at the inner circumferential portion of the disk substrate, the circumferential light textures in the inner circumferential portion having a cross angle characteristic in a range of 6 to 8 degrees, in a range of 2 to 4 degrees for an outer region of the remaining portion, and in arrange of 4 to 6 degrees for an intermediate region between the outer region and the inner circumferential region, respectively.

7. A textured disk substrate for fabricating a magnetic recording medium according to claim 6, wherein said disk substrate is an aluminum (Al) disk plated with nickel-phosphorous (NiP).

8. A textured disk substrate for fabricating a magnetic recording medium according to claim 6, wherein said circumferential light textures are formed by a two-step light texturing processes.

9. A textured disk substrate for fabricating a magnetic recording medium according to claim 6, wherein the roughness (Ra) of said circumferential light textures is in a range of between 8 and 12 Å.

* * * * *